United States Patent [19]
Gentry

[11] 3,952,423
[45] Apr. 27, 1976

[54] BIBLE BOARD GAME

[76] Inventor: Dale R. Gentry, Box 117, Carrollton, Mo. 64633

[22] Filed: Mar. 14, 1975

[21] Appl. No.: 558,228

Related U.S. Application Data

[63] Continuation-in-part of Ser. No. 432,300, Jan. 10, 1974, abandoned.

[52] U.S. Cl. .................................. 35/23 R; 40/65; 116/135
[51] Int. Cl.² ........................................... G09B 1/14
[58] Field of Search .......... 40/61 R, 62, 63 R, 64 R, 40/65; 116/135; 35/23 R, 31 E, 31 F, 24 A, 22 A, 69-73, 35 J; 273/130 R, 130 E, 135 D, 136 W, 136 Z, 137 B

[56] References Cited
UNITED STATES PATENTS

| | | | |
|---|---|---|---|
| 303,816 | 8/1884 | Crosby | 273/137 B |
| 601,383 | 3/1898 | Reuter | 273/135 R |
| 635,116 | 10/1899 | Woodhead | 273/130 R |
| 717,145 | 12/1902 | Van Gelder | 116/135 X |
| 736,140 | 8/1903 | Nicholl | 35/23 R X |
| 935,191 | 9/1909 | Day | 40/64 |
| 973,905 | 10/1910 | Alexander | 35/31 B UX |
| 1,201,100 | 10/1916 | Rice-Wray | 273/135 R |
| 1,262,269 | 4/1918 | Scherer | 35/23 R |
| 1,320,817 | 11/1919 | Yost | 273/131 B |
| 1,766,521 | 6/1930 | Klink | 35/23 R |
| 3,377,983 | 4/1968 | Gordon-Cooper | 116/135 |
| 3,514,873 | 6/1970 | Stobbe | 35/31 F |

*Primary Examiner*—William H. Grieb
*Attorney, Agent, or Firm*—Lowe, Kokjer, Kircher, Wharton & Bowman

[57] ABSTRACT

A game for teaching the books of the Bible includes a board having a plurality of slots extending into its edges. The slots are arranged in separate groups which are identified by traditional category titles. A plurality of blocks representing the books of the Bible are intended to be inserted into the slots in the proper order. Grooves formed in the opposite sides of each block mate with the edges of the slot into which the block is slidably inserted to interlockingly retain the blocks on the board. The board is further provided with an opening which permits it to be hung near a wall for group instruction purposes.

8 Claims, 3 Drawing Figures

U.S. Patent  April 27, 1976  3,952,423
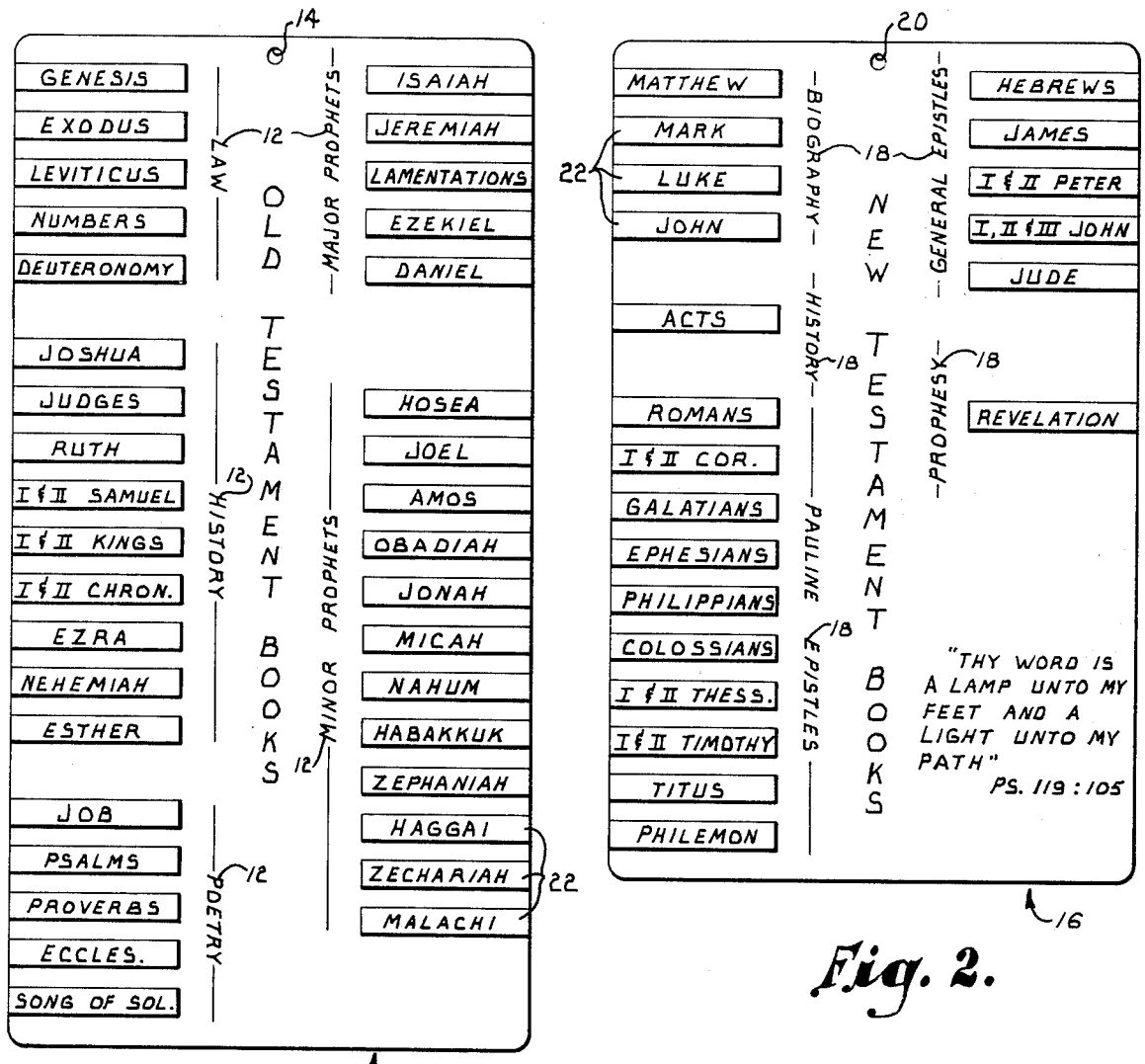
Fig. 1.
Fig. 2.
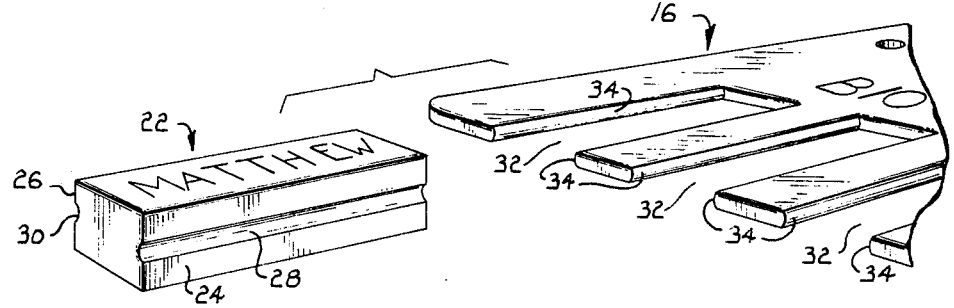
Fig. 3.

BIBLE BOARD GAME

BACKGROUND AND SUMMARY OF THE INVENTION

This application is a continuation in part of my prior application Ser. No. 432,300, now abandoned.

This invention relates to a game device which provides entertaining instruction in the books of the Bible.

Instruction relating to the names, order, and categorization of the books of the Bible normally requires pure memorization. Devices that have been developed in attempts to make the instruction more entertaining have not gained wide acceptance, primarily because they are typically complex and are therefore not suitable for use by children. Existing devices also lack durability and are thus highly susceptible to breakage. It is further desirable for devices of this type to be suitable for use by a relatively large group in order to permit efficient and economical group instruction. However, the devices presently available are usually intended for individual use, or at most for use by a small number of persons.

It is therefore a broad object of the present invention to provide an improved board game for teaching the books of the Bible in an entertaining manner.

A more specific object of the invention is to provide a board game for use in teaching the names, order, and categorization of the books of the Bible.

An additional object of the invention is to provide a board game of the character described which is simple enough to be played by children as well as adults.

Yet another object of the invention is to provide a board game of the character described in which the playing pieces are retentively positioned to the board in an improved manner in comparison to similar prior art devices.

In conjunction with the preceding object, it is a further object of the invention to provide a board game of the character described that may be hung near a wall or the like in order to serve as a teaching aid for a relatively large group.

A still further object of the invention is to provide a board game which is constructed ruggedly and yet may be manufactured economically.

Other and further objects of the invention, together with the features of novelty appurtenant thereto, will appear in the course of the following description of the drawing.

DETAILED DESCRIPTION OF THE INVENTION

In the accompanying drawing, which forms a part of the specification and is to be read in conjunction therewith, and in which like reference numerals are employed to indicate like parts in the various views:

FIG. 1 is a top plan view of a board and attached playing pieces constructed according to the invention, with the board marked for use in teaching the books of the Old Testament;

FIG. 2 is a top plan view of a board and attached playing pieces marked for use in teaching the books of the New Testament; and FIG. 3 is an exploded perspective view on an enlarged scale showing in detail the construction of the slots in the board, shown fragmentarily, and one of the playing pieces which has been slidably removed from its slot.

Referring now to the drawing in detail and initially to FIG. 1, reference numeral 10 designates a flat, substantially rectangular board which is preferably constructed of a plastic material or a similar lightweight and sturdy substance. The corners of board 10 are rounded to eliminate any sharp edges that may otherwise present a safety hazard. The flat top surface of board 10 is centrally marked with the legend "Old Testament Books" to indicate that the board is used in teaching the books of the Old Testament of the Bible. Board 10 is further marked with five category titles 12 which correspond to the categories into which the books of the Old Testament are traditionally grouped. A circular opening 14 is formed through board 10 at a central location near the top edge thereof and is sized to receive a nail or hanger (not shown) in order to permit the board to be suspended near a wall or blackboard.

With reference now to FIG. 2, a second board 16 of flat rectangular shape is centrally marked with the legend "New Testament Books" which indicates that the board is intended for use in teaching the books of the New Testament. Board 16 is likewise preferably constructed of a plastic material and has rounded corners. Five category titles 18 are marked on the top surface of board 16, and each title 18 corresponds to one of the traditional categories into which the books of the New Testament are grouped. Board 16 also includes a circular opening 20 at a central location near the top edge of the board.

A plurality of playing pieces or blocks 22 of uniform size and equal in number to the number of books in the Bible are included for use with boards 10 and 16. Referring to FIG. 3 in particular, blocks 22 are solid members of generally rectangular shape and are greater in height than the thickness of the boards 10 and 16. The blocks may be preferably constructed of a plastic or a similar material. Each block 22 has a flat upper side upon which a title is printed corresponding to a particular book of the Bible. For example, the block shown in FIG. 3 represents the book of Matthew, as indicated by the title imprinted thereon.

With continued reference to FIG. 3, each block 22 includes opposite sides 24 and 26 in which respective grooves 28 and 30 are formed. Grooves 28 and 30 are located substantially centrally of the height of the block and extend continuously the entire length thereof. Each groove 28 and 30 is of a smoothly curved concave configuration. The vertical dimension of each groove is substantially the same as the thickness of the boards 10 and 16.

A plurality of uniform slots 32 (FIG. 3) for slidably receiving blocks 22 are formed through board 16. Slots 32 extend into the opposite side edges of the board at spaced locations with respect to one another, as will be explained in more detail. Each slot 32 is of rectangular shape and is of the same length as blocks 22 so that when a block 22 is inserted in one of the slots 32, the outer edge of the blocks will be flush with the adjacent outer edge of board 16. The opposed sides of each slot 32 are defined by edges 34 which are formed on board 16 and which are smoothly rounded in a convex manner to present a configuration complementary to that of grooves 28 and 30. The width defined by each slot 32 (i.e., the distance between the opposed edges 34) is equal to the distance between the grooves 28 and 30 of each block 22 so that the blocks will snugly fit in slots 32 with grooves 28 and 30 interlocked with the opposite edges 34. It is to be understood that board 10 is likewise provided with a plurality of spaced slots which have the same configurations, dimensions, and edge construction as those shown in FIG. 3.

Referring again to FIGS. 1 and 2, slots 32 are arranged on boards 10 and 16 in a plurality of groups. For example, the first five slots on board 10 are spaced rather closely from one another to form a first group which is associated with the category title "Law". The sixth slot is spaced considerably below the fifth slot and is thereby included in the group associated with the category title "History". The remainder of the slots in board 10 are similarly arranged in groups that are designated by the remaining category titles 12. The slots in board 16 are likewise arranged in a plurality of groups, each of which is designated by one of the category titles 18.

In use, the invention provides a game which may be played competetively or individually and which offers entertaining instruction in the proper order and categorization of the books of the Bible. All of the blocks 22 are initially removed from boards 10 and 16, and the object of the game is to insert the blocks into slots 32 in the proper order. It should now be apparent that as a player learns the proper order of the books, he will at the same time receive instruction as to the title of the category into which each book falls.

Each block 22 is installed on board 10 or 16 by sliding the block into the selected slot 32 such that grooves 28 and 30 are received by the edges of the slot. The dimensions of the blocks 22 and slots 32 are such that the inserted blocks are closely received and held within the slots. Consequently, the inserted blocks are firmly interlocked with the playing boards and will not inadvertently become displaced, although they may be easily removed from the slots when desired.

It is further pointed out that the opening 14 and 20 permits boards 10 and 16 to be hung in a vertical position from a nail or hook. Consequently, the board may be hung near a wall or blackboard to provide instruction to a large group, and the firm manner in which blocks 22 are interlockingly held in place is particularly important when the device is used in this manner.

It should be apparent that both Testaments of the Bible may be represented on a single board. It is also contemplated that means for providing clues as to the correct order of blocks 22 on the boards may be provided. For example, a familiar quotation from a Bible book may be marked near each slot 32, and a related quotation may be marked on the underside of each block 22 so that comparison of the quotations will give clues to the players.

Having thus described my invention, I claim:

1. An educational game device for use in teaching the books of the Bible comprising:
   a board having a plurality of spaced, three-sided uniform slots formed therein, said board defining slot edges extending the entire thickness of said board along the opposite sides of each slot; and
   a plurality of blocks representing the books of the Bible, each of said blocks being of considerably greater thickness than said board and each of said blocks including opposite sides having elongate grooves therein sized to mate with said slot edges, each groove having a width substantially equal to the thickness of said board and slot edges, whereby said blocks are slidably insertable into said slots with said grooves receiving said slot edges to interlockingly retain said blocks in place on said board with each block projecting a substantial distance from the board in opposite directions.

2. The game device as in claim 1, wherein the distance between said slot edges of each slot corresponds to the dimension between said grooves of each block, and wherein the length of each said slot corresponds to the length of each said block.

3. The game device as in claim 1, wherein said slot edges are a convex surface and said grooves are a concave surface complementary to the surface of said slot edges.

4. The game device as in claim 1, wherein said slots are arranged on said board in a plurality of distinct groups spaced from one another, said board having label means thereon indicating a category title associated with each of said groups.

5. The game device as in claim 4 for teaching the books of the Old Testament of the Bible wherein said slots are arranged on said board in five distinct groups spaced from one another, said distinct groups being three groups of five slots each, one group of nine slots, and one group of twelve slots.

6. The game device as in claim 4 for teaching the books of the New Testament of the Bible, wherein said slots are arranged on said board in five distinct groups spaced from one another, said distinct groups being two groups of one slot each, one group of four slots, one group of five slots, and one group of ten slots.

7. The game device as in claim 1, including hanger means for suspending said board in a sustantially vertical orientation.

8. The game device as in claim 7, wherein said hanger means comprises an opening formed through said board.

* * * * *